United States Patent
Murakami

(10) Patent No.: US 9,588,934 B2
(45) Date of Patent: Mar. 7, 2017

(54) ULTRASONIC TYPE FLOWMETER APPARATUS AND METHOD OF USING THE SAME

(71) Applicant: ATSUDEN CO., LTD., Tokyo (JP)

(72) Inventor: Eiichi Murakami, Tokyo (JP)

(73) Assignee: ATSUDEN CO., LTD., Tokyo (JP)

( * ) Notice: Subject to any disclaimer, the term of this patent is extended or adjusted under 35 U.S.C. 154(b) by 1001 days.

(21) Appl. No.: 13/675,386

(22) Filed: Nov. 13, 2012

(65) Prior Publication Data

US 2013/0124131 A1  May 16, 2013

(30) Foreign Application Priority Data

Nov. 16, 2011  (JP) .................. 2011-250569

(51) Int. Cl.
*G06F 15/00* (2006.01)
*G01F 25/00* (2006.01)
*G01F 1/66* (2006.01)

(52) U.S. Cl.
CPC .............. *G06F 15/00* (2013.01); *G01F 1/662* (2013.01); *G01F 1/667* (2013.01); *G01F 1/668* (2013.01); *G01F 25/0007* (2013.01)

(58) Field of Classification Search
CPC .. G01F 1/6965; G01F 1/8436; G01F 25/0007; G01F 25/00; G01F 1/668; G01F 1/667; G01N 29/024; G01N 2001/1056; A61M 2205/6018
USPC ................. 702/100, 45; 73/61, 194; 604/180
See application file for complete search history.

(56) References Cited

U.S. PATENT DOCUMENTS

| | | | | |
|---|---|---|---|---|
| 4,080,837 A * | 3/1978 | Alexander et al. | .......... | 73/61.45 |
| 4,236,406 A * | 12/1980 | Reed et al. | .................. | 73/61.45 |
| 4,573,346 A * | 3/1986 | Zacharias, Jr. | .............. | 73/61.45 |
| 4,891,969 A * | 1/1990 | Wayland et al. | ............ | 73/61.44 |
| 5,300,037 A * | 4/1994 | Delk et al. | ..................... | 604/180 |
| 5,463,906 A | 11/1995 | Spani et al. | | |
| 6,629,934 B2 | 10/2003 | Mault et al. | | |
| 7,673,527 B2 | 3/2010 | Ehring et al. | | |
| 2002/0078760 A1* | 6/2002 | Matsushima | .......... | G01F 1/667 73/861.29 |
| 2009/0055119 A1* | 2/2009 | Baumoel | ............. | G01F 25/0007 702/100 |
| 2009/0071263 A1* | 3/2009 | Schulz | ................ | G01F 25/0007 73/861.12 |

FOREIGN PATENT DOCUMENTS

| | | |
|---|---|---|
| JP | 2000-189419 A | 7/2000 |
| JP | 2002-513296 A | 5/2002 |
| JP | 2002-236045 A | 8/2002 |
| JP | 2002-277300 A | 9/2002 |

(Continued)

*Primary Examiner* — Jonathan C Teixeira Moffat
*Assistant Examiner* — Eyob Hagos
(74) *Attorney, Agent, or Firm* — Holtz, Holtz & Volek PC

(57) ABSTRACT

A disposable conduit 1 includes piezo-electric elements 2a and 2b and a memory chip 10 in which calibration data specific to the relevant conduit is stored. Before measurement, a non-disposable electrical measuring circuit reads the calibration data out of the memory chip 10 to prepare a calibrating equation or a calibration table. A flow speed of a blood passing through the conduit or a flow rate calculated from the flow speed is corrected in accordance with the calibrating equation or calibration table.

8 Claims, 7 Drawing Sheets

(56) References Cited

FOREIGN PATENT DOCUMENTS

| | | | |
|---|---|---|---|
| JP | 2002-365106 | A | 12/2002 |
| JP | 2003-505180 | A | 2/2003 |
| JP | 2003-75219 | A | 3/2003 |
| JP | 2003-262545 | A | 9/2003 |
| JP | 2004-537328 | A | 12/2004 |
| JP | 2005-189181 | A | 7/2005 |
| JP | 2005-192687 | A | 7/2005 |
| JP | 2007-71695 | A | 3/2007 |
| JP | 2008-512652 | A | 4/2008 |
| JP | 2010-519506 | A | 6/2010 |
| JP | 4991963 | B1 | 5/2012 |

* cited by examiner

ULTRASONIC TYPE FLOWMETER APPARATUS AND METHOD OF USING THE SAME

BACKGROUND OF THE INVENTION

Field of the Invention

The present invention relates to an ultrasonic type flowmeter apparatus and a method of using the same. Particularly, the present invention relates to an ultrasonic type flowmeter apparatus preferably used in a cardiac surgery for measuring a flow rate of a blood flowing through an auxiliary heart, in which a part of the ultrasonic type flowmeter apparatus is disposed in order to avoid undesired infection.

Related Art Statements

The ultrasonic type flowmeter apparatus comprises a conduit having, for instance a crank shape, and a pair of piezo-electric transducer elements each serving as an ultrasonic signal transmission and reception element are provided at both ends of a straight portion of the conduit. To this end, the conduit must include fitting portions, and furthermore the conduit has to comprise an inlet portion and an outlet portion. It is difficult to make the conduit by a single molding of synthetic resin. Therefore, usually a plurality of parts of the conduit are formed separately, and then these parts are assembled or composed by fusing or cementing to form the final conduit.

According to the above assembling operation, beads and debris might be produced within the straight portion of the conduit through which an ultrasonic beam propagates during the measurement. Moreover, centerlines of the fused parts might not be coincided with each other, and therefore a liquid could not flow through the conduit smoothly and an undesired turbulence might be generated. Furthermore, a length and an inner diameter of the straight portion might include error and a precision of securing the ultrasonic signal transmission and reception elements might be lowered. Therefore, flow characteristics of respective conduits are sometimes different from one another. In order to compensate the differences in the flow characteristics of respective crank-shaped conduits or inner reflection type conduits, it has been known to derive calibration data from measured values obtained in electrical measuring circuits by flowing a standard liquid such as water at known rates through the respective conduits. Then, the thus obtained calibration data is stored in memories installed in respective electrical measuring circuits. A pair of a conduit and a measuring circuit having a memory storing calibration data obtained for the relevant conduit is shipped from a factory.

PRIOR ART PUBLICATIONS

[Patent Publication 1] Japanese Patent Laid-open Publication Tokkai 2005-192687
[Patent Publication 2] U.S. Pat. No. 5,463,906
[Patent Publication 3] Japanese Patent Laid-open Publication Tokuhyo No. 2010-519506

In the Patent Publication 1, there is disclosed a blood flowmeter apparatus for monitoring a blood flow rate during the cardiac surgery. In this field, the conduit can be used only once, and the used conduit has to be disposed together with an auxiliary artificial heart after the cardiac surgery in order to avoid infection. However, the electrical measuring circuit is more expensive than the conduit, and therefore it is desired to use the measuring circuit repeatedly. In the Patent publications 2 and 3, there are proposed disposable type conduits for use in blood flowmeter apparatuses in which the measuring circuit is used repeatedly.

In the ultrasonic type flowmeter apparatuses using the disposable conduits, it is desired to derive calibration data by flowing standard liquid such as water through a conduit at known flow rates. Even if the thus derived calibration data is stored in the electrical measuring circuit, it is rather difficult to correlate the calibration data with plural conduits, when the electrical measuring circuit is repeatedly used.

In the Patent Publication 3, there is described that since a variation of inner diameters of conduits is not larger than 1%, it is unnecessary to derive the calibration data before the actual measurement. However, in practice, a fluctuation of flow characteristics of respective conduits due to errors in processing the conduits could not be ignored as described above.

In the known ultrasonic type flowmeter apparatuses described in the Patent Publications 2 and 3, piezo-electric elements serving as the ultrasonic signal transmission and reception elements are repeatedly used. That is to say, after the measurement, these elements are removed from a used conduit and before conducting a new measurement; the removed elements are secured to a new conduit. Conditions of securing the piezo-electric elements to the conduit might affect largely the measurement precision, but a degree of the affection of the securing condition to the measurement could not be known. Therefore, it has been impossible to assure the accurate measurement when the piezo-electric elements are repeatedly used.

SUMMARY OF THE INVENTION

Problems to be Solved by the Invention

The present invention has for its object to provide a novel and useful ultrasonic type flow sensor which can remove the above mentioned drawbacks of the known flowmeter apparatuses and can attain a high measurement precision by deriving calibration data before measurement, storing the thus derived calibration data in a memory installed in a disposable conduit, and reading the thus stored calibration data into a repeatedly used electrical measuring circuit upon the actual measurement.

According to the invention, an ultrasonic type flowmeter apparatus includes a disposable unit and a non-disposable unit, characterized in that said disposable unit comprises a conduit having a straight pipe portion through which a liquid whose flow rate is to be measured is flown, an inlet pipe portion arranged at an upstream position for introducing the liquid into the straight pipe portion, and an outlet pipe portion arranged at a downstream position for drawing the liquid from the straight pipe portion, said straight pipe portion, inlet pipe portion and outlet pipe portion being coupled with one another;

a pair of ultrasonic signal transmission and reception elements arranged at the upstream position and a downstream position, respectively of said straight pipe portion; and a memory portion for storing calibration data specific to the relevant conduit, said calibration data being obtained from a standard electrical measuring circuit by flowing a standard liquid through the conduit at known flow rates; and that said non-disposable unit comprises an electrical measuring circuit portion for reading the calibration data out of said memory portion upon an actual measurement, driving said pair of the ultrasonic signal transmission and reception elements to emit ultrasonic beams alternately, receiving ultrasonic signal generated from the ultrasonic signal transmission and reception elements which receive the ultrasonic beams, calculating flow rates by processing the ultrasonic signals and correcting the flow rates in accordance with the calibration data.

According to another aspect of the invention, a method of using an ultrasonic type flowmeter apparatus as defined above, wherein said method includes a step of deriving the calibration data specific to the relevant conduit by flowing the standard liquid through the conduit at known flow rates;

a step of storing the calibration data into said memory portion;

a step of reading the calibration data stored in the memory portion into the electrical measuring circuit portion upon the actual measurement;

a step of driving said pair of the ultrasonic signal transmission and reception elements to emit ultrasonic beams alternately;

a step of receiving ultrasonic signal generated from the ultrasonic signal transmission and reception elements which receive the ultrasonic beams; and a step of processing the ultrasonic signals together with the calibration data to derive corrected flow rates of the liquid.

In the ultrasonic type flowmeter apparatus according to the invention, the calibration data is stored in the memory portion fixed to the disposable conduit, upon the actual measurement the calibration data stored in the memory portion is read into the electrical measuring circuit portion which is non-disposable, and the ultrasonic signals generated from the ultrasonic signal transmission and reception elements are processed in the electrical measuring circuit portion in accordance with the calibration data. In this manner, it is possible to derive the flow rate accurately corrected by the calibration data. Moreover, the rather expensive electrical measuring circuit portion can be used repeatedly, and therefore a running cost of the whole system can be reduced.

Figure 1:
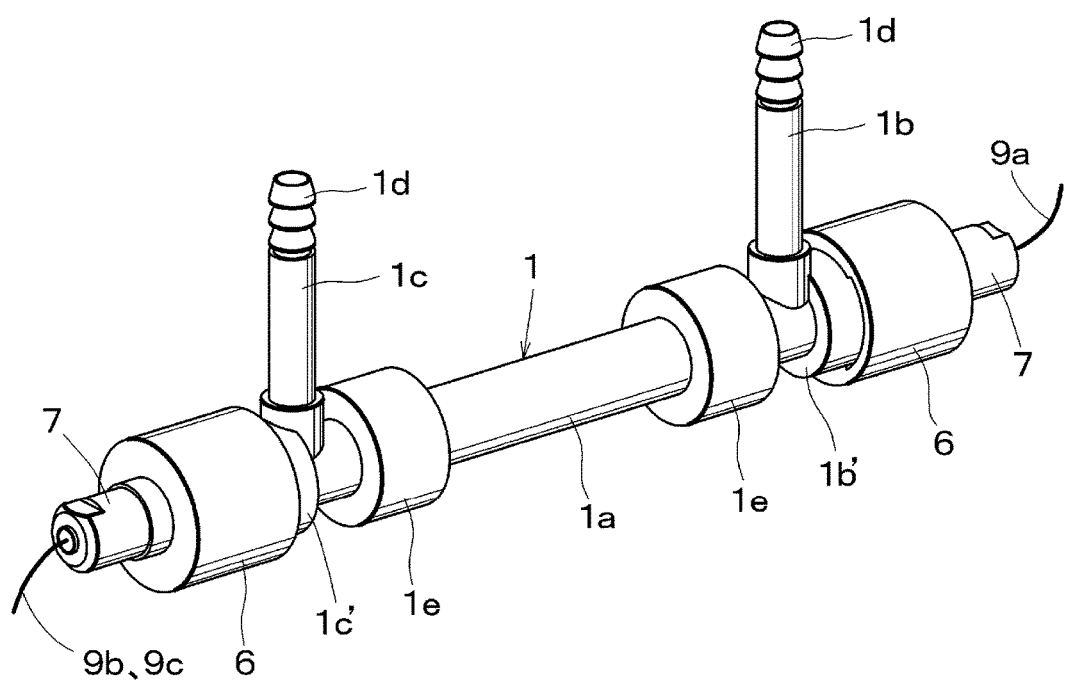
FIG. 1 is a perspective view showing a conduit of a first embodiment of the ultrasonic type flowmeter apparatus according to the invention.

In the drawings, a reference numeral 1 denotes a conduit, 1a a straight pipe portion, 1b an inlet pipe portion, 1c an outlet pipe portion, 1a' a straight pipe member, 1b' an inlet pipe member, 1c' an outlet pipe member, 2 piezo-electric elements, 3 an element supporting member, 4 a pushing member, 6 a locking member, 7 a cap, 8 lead wires, 9 signal wires, 10 a memory chip, 11 insertion plugs, 21 a standard flowmeter, 22 pipes. 24 a pump, 25, 32 an electrical measuring circuit portion, 31 a holder, 33 a housing, 34 connectors, and a reference numeral 35 represents an auxiliary artificial heart pump.

DESCRIPTION OF THE PREFERRED EMBODIMENTS

Embodiment 1

Figure 2:
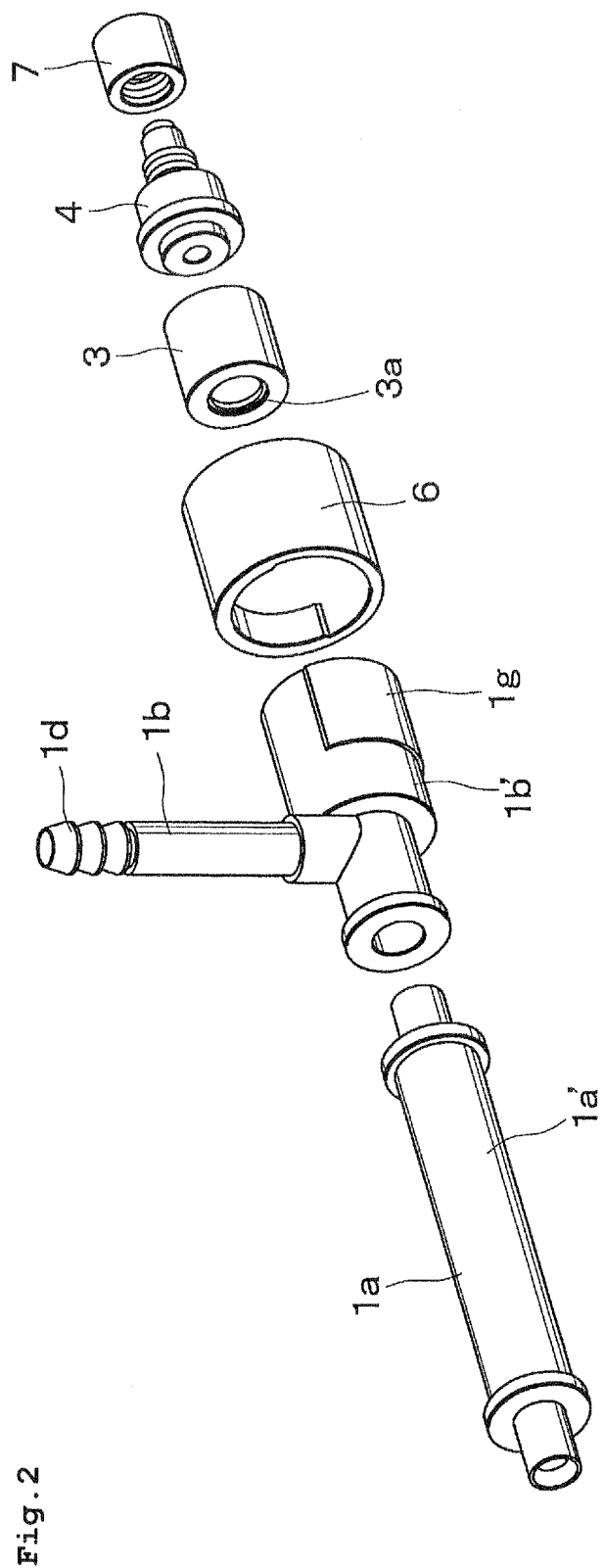
FIG. 2 is an exploded perspective view illustrating the conduit.
Figure 3:
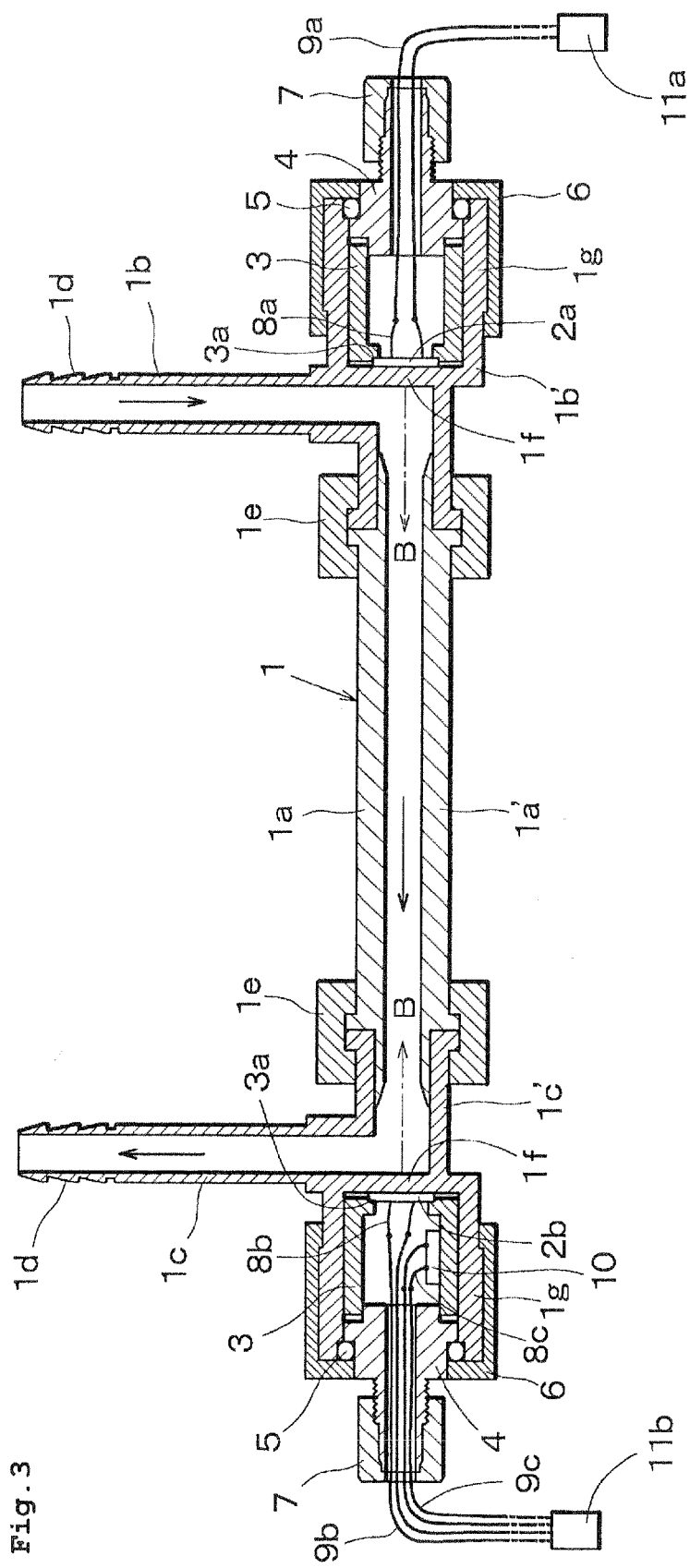
FIG. 3 is a cross sectional view depicting a detailed structure of the conduit.

Now embodiments of the ultrasonic flow sensor according to the invention will be explained in detail with reference to the attached drawings. FIGS. 1, 2 and 3 are a perspective view, an exploded perspective view and a cross sectional view, respectively showing a disposable conduit of the first embodiment of the ultrasonic type flowmeter apparatus according to the invention. It should be noted that in FIG. 2, a lower stream portion of the conduit is not shown, because the conduit has a symmetrical construction.

The conduit 1 made of a synthetic resin such as polypropylene and Teflon (registered trade mark) comprises a straight pipe portion 1a, an inlet pipe portion 1b and an outlet pipe portion 1c. The inlet and outlet pipe portions 1b and 1c are coupled with the straight pipe portion 1a at its both ends such that these pipe portions 1b and 1c extend perpendicularly to the straight pipe portion 1a to form a so-called crank-shape conduit.

The straight pipe portion 1a, inlet pipe portion 1b and outlet pipe portion 1c have an inner diameter of, for instance 4 mm. At free ends of the inlet and outlet pipe portions 1b and 1c, there are formed fitting mouths 1d having plural steps such that flexible tubes made of a synthetic resin and connecting to an auxiliary heart can be easily coupled with the inlet and outlet pipe portions 1b and 1c and could not be easily removed from the pipe portions. The pipe portions may be made of a transparent material, and then it is easy to monitor a blood flow passing through the pipe portions.

The conduit 1 is consisting of members, i.e. a straight pipe member 1a' constituting the straight pipe portion 1a, an inlet pipe member 1b' including the inlet pipe portion 1b and an outlet pipe member 1c' including the outlet pipe portion 1c. The inlet and outlet pipe members 1b' and 1c' have the same configuration.

The above mentioned three members 1a', 1b' and 1c' are formed by injection molding. The ends of the straight pipe member 1a' are inserted into ends of the inlet and outlet pipe members 1b' and 1c' such that flanges formed at the ends of the straight pipe member 1a' are abutted onto flanges formed at the ends of the inlet and outlet pipe members 1b' and 1c'. In this manner, the straight pipe member 1a' and inlet and outlet pipe members 1b' and 1c' are positioned correctly. An inner diameter of the end portions of the straight pipe member 1a' is tapered such that the liquid flow is not disturbed by undesired resistance. The connecting portions of the straight pipe member 1a' and the inlet and outlet pipe members 1b' and 1c' are covered by connection members 1e formed by double injection molding. In this manner, these pipe members 1a', 1b' and 1c' are tightly and firmly coupled with one another.

The inlet and outlet pipe members 1b' and 1c' further include tubular piezo-electric fitting portions 1g which extend outwardly from end walls 1f of the inlet and outlet pipe members 1b' and 1c' opposing each other via the straight pipe portion 1a. Into the piezo-electric element fitting portions 1g are inserted cylindrical element holding members 3, and piezo-electric elements 2a and 2b serving as the ultrasonic signal transmission and reception elements are fitted into ring-shaped recesses 3a formed in end portions of the elements holding members 3. Pushing members 4 are firmly inserted into end portions of the element holding members 3. The element holding members 3 and pushing members 4 are forcedly inserted into the element fitting members 1g by means of locking members 6 via O-rings 5 made of rubber or soft synthetic resin. Caps 7 are screwed to free ends of the pushing members 4.

Lead wires 8a and 8b extending from the piezo-electric elements 2a and 2b, respectively are connected to one ends of signal wires 9a and 9b, respectively by soldering. These signal wires 9a and 9b are extended to the external via holes formed in the pushing members 4 and caps 7. Within the element holding member 3 secured to the outlet pipe member 1c', is installed a memory chip 10 formed by a semiconductor memory. Lead wires 8c extended from the memory chip 10 are connected to signal wires 9c which extend to the external together with the signal wires 9b. The signal wires 9a and the signal wires 9b and 9c are connected to insertion plugs 11a and 11b, respectively.

Upon securing the piezo-electric elements 2a and 2b to the conduit 1 comprising the members 1a', 1b' and 1c' coupled with one another by the double molding, at first the piezo-electric elements 2a and 2b are fixed to the annular recesses 3a formed in the end portions of the element holding members 3 and the memory chip 10 is secured to the inner wall of the element holding member 3. After that, the lead wires 8a, 8b and 8c are connected to the signal wires 9a, 9b and 9c. In this condition, the element holding members 3 are inserted into the element fitting portions 1g, and then the pushing members 4 are forcedly inserted into the element holding members 3 by means of the locking members 6. In this manner, the piezo-electric elements 2a and 2b are urged against the outer surfaces of the walls if of the element holding portions 1g and are fixed in position with respect to the straight pipe portion 1a.

Since the O-rings 5 are inserted between the locking members 6 and the pushing members 4, the piezo-electric elements 2a and 2b are urged against the outer surfaces of the walls if of the straight pipe portion 1a with a suitable elastic force. The piezo-electric elements 2a and 2b are intimately contacted with the outer surfaces of the walls if by applying grease or a silicon rubber jell sheet on front surfaces of the piezo-electric elements 2a and 2b. In this manner, the ultrasonic beams emitted from the piezo-electric elements 2a and 2b can propagate efficiently into the walls 1f. The piezo-electric elements 2a and 2b are positioned such that the ultrasonic beam emitted from one of the piezo-electric elements propagates though the straight pipe portion 1a and arrives at the other piezo-electric element and vice versa.

In general, flow characteristics of the conduits of the ultrasonic type flowmeter apparatus differ from respective conduits. Also in the ultrasonic type flowmeter apparatus according to the invention, flow characteristics of respective conduits are affected by various factors such as deviations of axial lines of the combined pipe portions 1a, 1b and 1c and accuracy in securing the piezo-electric elements 2a and 2b.

In the present embodiment, respective conduits are used together with a standard measuring circuit to measure a flow rate while flowing a liquid under known flow rate. Then, the measured flow rate is compared with the actual flow rate to derive calibration data. The calibration data thus derived is stored in the memory chip 10 via the signal wires 9c.

In actual measurement, the calibration data stored in the memory chip 10 is read out and is supplied to the measuring circuit, and actually measured value is calibrated in accordance with the calibration data to derive a correct flow rate. In this manner, any conduits can be used for any measuring circuits. To this end, each of the measuring circuits has the same characteristic as the standard measuring circuit used for deriving the calibration data. Therefore, any conduits each having specific calibration data stored in the memory chip can be used for any measuring circuits having the same specifications or model numbers. In this manner, according to the invention, the rather expensive measuring circuit can be used repeatedly without being disposed.

Figure 4:
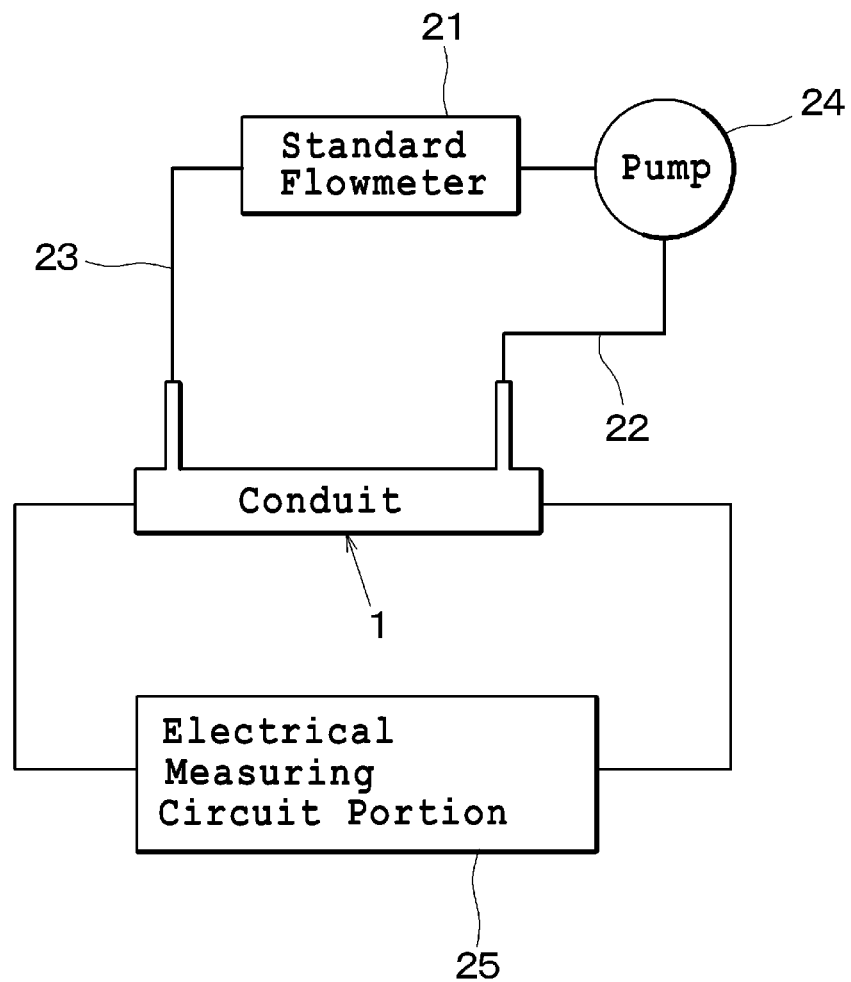
FIG. 4 is a schematic diagram representing the ultrasonic type flowmeter apparatus.

In order to derive the calibration data, a standard flowmeter 21 and pump 24 are connected to the conduit 1 via tubes 22 and 23 as shown in FIG. 4. The conduit 1 and tubes 22 and 23 are filled with a standard liquid such as water and the water is flown by the pump 24 while the flow rate is changed over a predetermined range. At the same time, measured values obtained in a measuring circuit 25 at various flow rates processed to derive calibration data. For instance, measured values obtained at sixteen flow rate points may be derived as the calibration data. The thus derived calibration data is stored in the memory chip 10 installed within the conduit 1. It should be noted that an ultrasonic type flowmeter may be used as the standard flowmeter 21, but any other type of flowmeter may be used.

Figure 5:
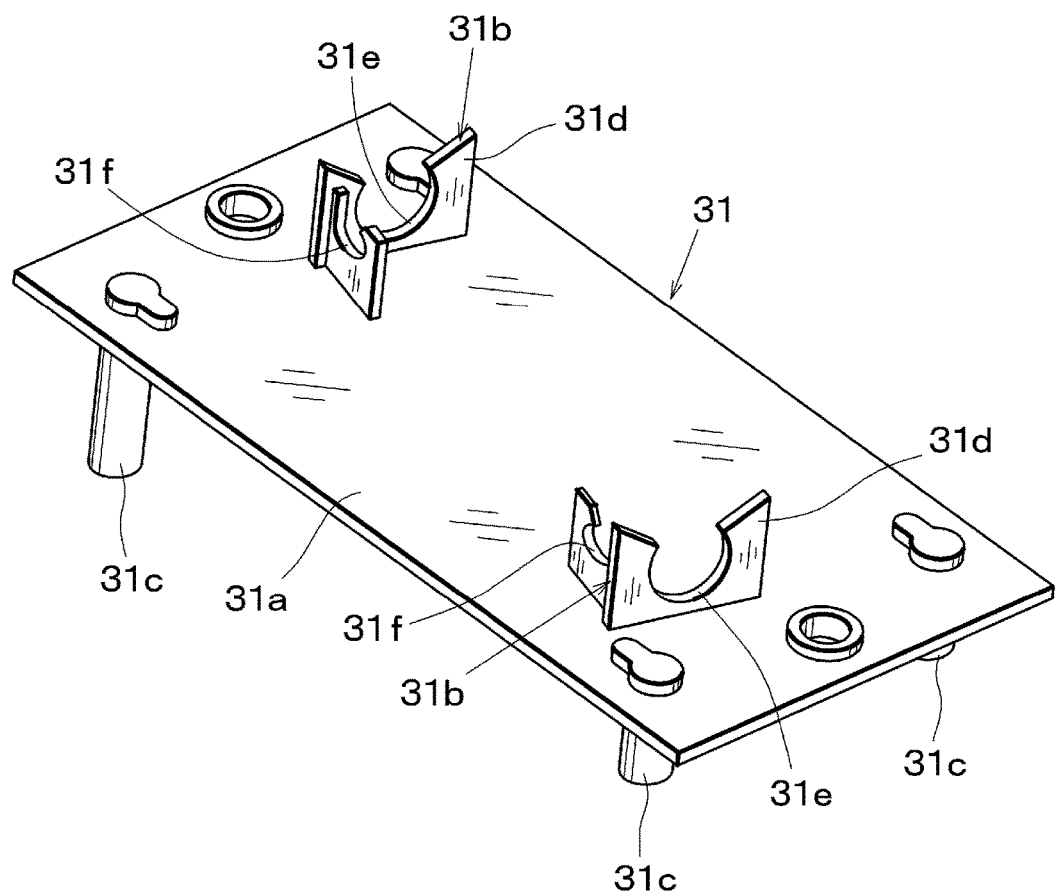
FIG. 5 is a perspective view showing a holder for supporting the conduit.

In an actual measuring of flow rate of blood, a sterilized conduit 1 having the calibration data stored therein is held on a holder 31 made of synthetic resin as illustrated in FIG. 5. The holder 31 includes a base plate 31a and a pair of supporting stands 31b detachably secured to the base plate 31a. In order not to remain air bubbles possibly contained in the blood within the conduit 1, the base plate 31a is supported by legs 31c having different lengths such that the outlet portion of the conduit 1 situates above the inlet portion by, for instance 15 degrees. Each of the supporting stands 31b includes a wall 31d having a substantially L-shaped configuration viewed in a direction perpendicular to the base plate 31a. The supporting stands 31b are aligned in a direction which is inclined by, for instance 15 degrees with respect to a longitudinal axial line of the base plate 31a.

A longer portion of each of the walls 31d has formed therein a cutout portion 31e having a substantially circular shape such that the conduit 1 can be inserted into or removed from the cutout portions 31d with a feeling of click. A shorter portion of each of the walls 31d has formed therein a cutout portion 31f. The cutout portions 31f are shaped such that the inlet pipe portion 1b and outlet pipe portion 1c can be easily and positively inserted into and removed from the cutout portions 31f.

Figure 6:
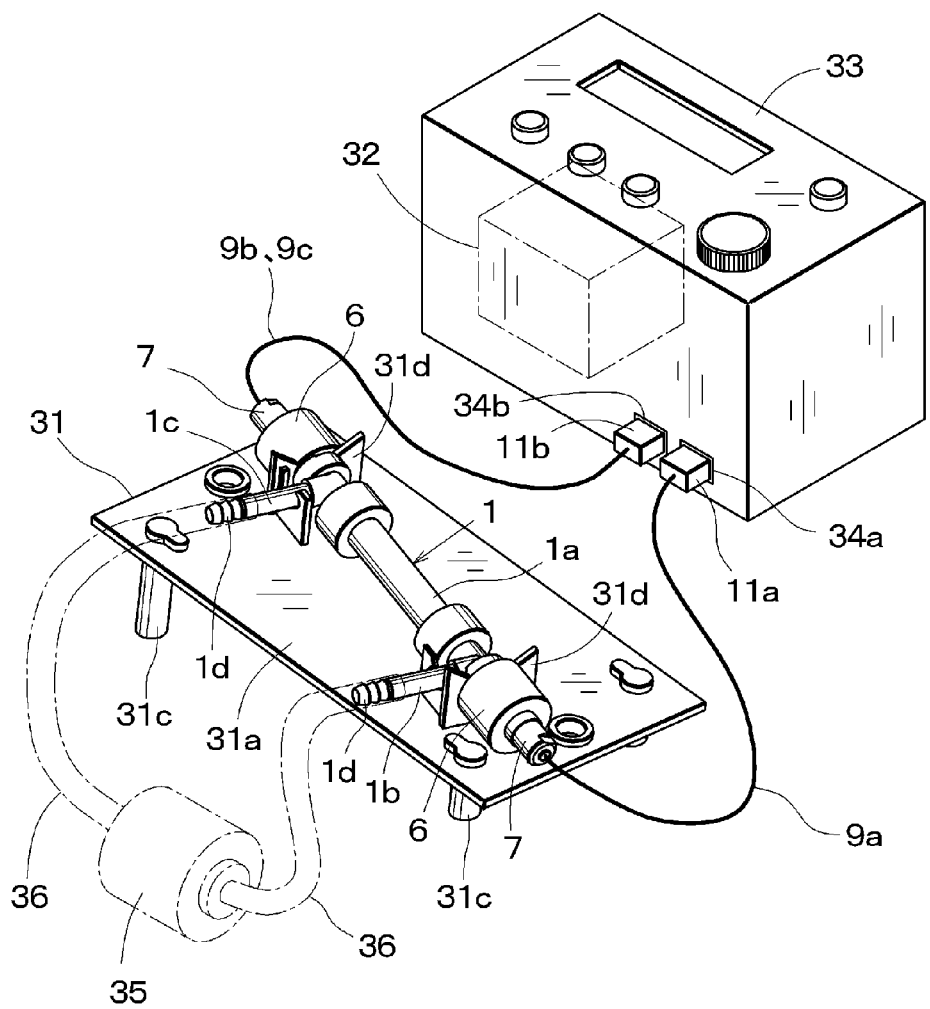
FIG. 6 is a schematic view illustrating a system of measuring a blood flow rate using the ultrasonic type flowmeter apparatus according to the invention.

The conduit 1 is set on the holder 31 as depicted in FIG. 6. An electrical measuring circuit portion 32 is installed within a housing 33 made of synthetic resin. The plugs 11a and 11b of the signal wires 9a, 9b and 9c are inserted into connectors 34a and 34b provided on the housing 33. These connectors 34a and 34b are connected to the electrical measuring circuit portion 32 including a piezo-electric element driving circuit portion, a calculation and control circuit portion, an output circuit portion, and so on.

Figure 7:
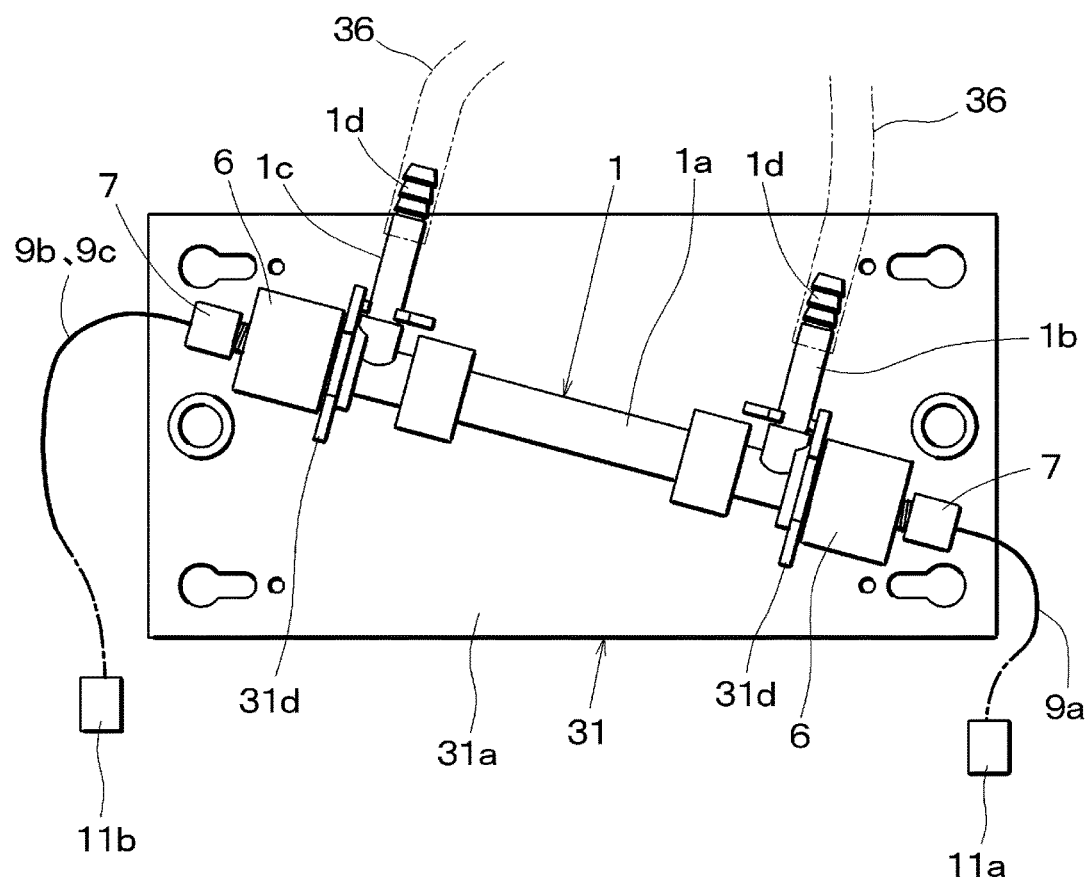
FIG. 7 is a schematic view showing a holder hung on an upright wall.

As illustrated in FIG. 7, the supporting holder 31 may be hung on an upright wall, while all the legs 31c being removed from the base plate 31. Then the conduit 1 is set on the supporting holder 31. In this case, when the supporting holder 31 is set on the upright wall such that the longitudinal direction is coincided with the horizontal direction, the outlet pipe portion 1c of the conduit 1 is positioned above the inlet pipe portion 1b. Therefore, air bubbles can be easily removed from the conduit 1 and much more accurate flow rate measurement can be performed.

Before measuring the flow rate, the calibration data stored in the memory chip 10 installed in the conduit 1 is read into the calculation and control circuit portion of the electrical measuring circuit portion 32. The calculation and control circuit portion produces a calibration equation or calibration table from the calibration data read out of the memory chip 10. Since the calibration data stored in the memory chip 10 is derived at discrete flow rates, additional calibration data for flow rates situating between the discrete flow rates is derived by the interpolation method. It should be noted that the calibrating operation may be conducted not only by preparing a calibrating equation, but also by correcting output signals obtained from the conduit 1 in accordance with the calibration data.

Next, the inlet and outlet pipe portions 1b and 1c are coupled with an auxiliary artificial heart pump 35 by means of flexible tubes 36 made of synthetic resin.

During the operation, the auxiliary artificial heart pump 35 makes a blood flow pass through the inlet pipe portion 1b, straight pipe portion 1a and outlet pipe portion 1c in this order. The piezo-electric elements 2a and 2b are driven by an ultrasonic signal transmission and reception element driving circuit in the electrical measuring circuit portion 32 to emit ultrasonic beams B (see FIG. 3) from the piezo-electric elements 2a and 2b alternately. Then the piezo-electric elements 2a and 2b receive the ultrasonic beams B to produce ultrasonic signals to the electrical measuring circuit portion 32. In the calculation and control circuit provided in the electrical measuring circuit portion 32, a flow speed of the blood is first detected by processing the ultrasonic signals, and then a flow rate of the blood is calculated from the flow speed.

The ultrasonic beam B emitted from the piezo-electric element 2a placed at an upstream position of the blood flow passing through the straight pipe portion 1a propagates through the blood within the straight pipe portion 1a and arrives at the piezo-electric element 2b placed at a downstream position. The ultrasonic beam B emitted from the piezo-electric element 2b propagates through the blood within the straight pipe portion 1a and is received by the piezo-electric element 2a.

A propagation speed of the ultrasonic beam B emitted from the piezo-electric element 2a and received by the piezo-electric element 2b is increased by the blood flow passing through the straight pipe portion 1a in the direction shown by an arrow in FIG. 3. Contrary to this, a propagation speed of the ultrasonic beam B emitted from the piezo-electric element 2b and received by the piezo-electric element 2a is reduced by the blood flow. Therefore, there is produced a difference in a propagation time period between the above mentioned two ultrasonic beams B. This propagation time difference is detected by the electrical measuring circuit portion 32 to derive a velocity of the blood flow. Then, a flow rate of the blood is calculated by multiplying the velocity of blood flow by a cross sectional area of the straight pipe portion 1a. The calculation and control circuit in the electrical measuring circuit portion 32 calibrates the thus derived flow rate to produce a corrected flow rate. In this manner, the flow rate of the blood flowing through the straight pipe portion 1a can be measured in an accurate manner.

After the measurement, the plugs 11a and 11b are removed from the connectors 34a and 34b and the conduit 1 is removed from the holding stands 31b of the holder 31. The conduit 1, piezo-electric elements 2a and 2b, element supporting members 3, locking members 6 signal wires 9a, 9b and 9c, memory chip 10, insertion plugs 11a and 11b and so on are disposed together with the auxiliary artificial heart pump 35 and flexible tubes 36. It should be noted that the holder 31, electrical measuring circuit portion 32, connectors 34a and 34b are used again for a new conduit 1 having a memory chip 10 storing calibration data for the relevant conduit 1.

In the embodiment so far explained, the members 1a', 1b' and 1c' are coupled with one another by means of the coupling member 1e formed by the double molding, but according to the invention, these members 1a', 1b' and 1c' may be coupled with one another by fusing.

Furthermore, a means for securing the piezo-electric elements 2a and 2b to the outer surfaces of the walls if may not be limited in the embodiment described above. Since the piezo-electric elements 2a and 2b are not used repeatedly, they may be secured, for example, to the members 1a', 1b' and 1c. Moreover, the locking member 6 may be secured to the element fitting member 1g by a cementing agent.

In the above embodiment, the signal wires 9a, 9b and 9c having one ends soldered to the lead wires 8a and 8b of the piezo-electric elements 2a and 2b and memory chip 10 are extended through the caps 7, but according to the invention connector sockets connected to the lead wires 8a and 8b may be provided in the caps 7. Then, the signal wires may be extended from the electrical measuring circuit portion 32 and may be used repeatedly.

Furthermore, a wireless IC tag may be used instead of the memory chip 10. Alternatively, the memory chip 10 may be replaced by a label having a bar code representing calibration data. Then, the bar code is read by a bar code reader to derive the calibration data.

In the above explained embodiment, the flowing speed of the blood is first calibrated in accordance with the calibration data read out of the memory chip 10, and then the flow rate is calculated from the thus calibrated flow speed. According to the invention, the calibration may be performed in various ways. For instance, a flow rate calculated from a measured flow speed may be corrected in accordance with calibration data. It should be noted that in the present invention, the calibration for the flow rate includes a case in which a flow speed is calibrated.

In the embodiment mentioned above, the conduit 1 is formed as the crank-type conduit, but according to the invention a pair of piezo-electric elements may be secured to the straight pipe portion such that the ultrasonic beams propagate within the straight pipe portion in inclined directions with respect to a center axial line.

In the above embodiment, the flow rate of blood is measured, but the ultrasonic type flowmeter apparatus according to the invention may be equally applied to any other liquid such as liquid containing medicines and biological molecular substances. Also in such cases, the conduit must be disposed after being used once.

The ultrasonic type flowmeter apparatus according to the invention is preferably used for measuring a flow rate under such circumstance that the conduit should be disposed after being used once, but it is apparent that the conduit of the ultrasonic type flowmeter apparatus according to the invention may be used repeatedly.

The invention claimed is:

1. An ultrasonic type flowmeter apparatus comprising:
a disposable structure that is disposed after use; and
a non-disposable structure comprising an electrical measuring circuit that is repeatedly used for a plurality of respective flow rate measurement operations and which is connectable to said disposable structure,
wherein said disposable structure comprises:
a disposable conduit including a pair of ultrasonic signal transmission and reception elements, and a memory which is attached to said disposable conduit,
wherein said disposable conduit has a straight pipe portion through which a liquid whose flow rate is to be measured is flown, an inlet pipe portion arranged at an upstream position of the straight pipe portion for introducing the liquid into the straight pipe portion, and an outlet pipe portion arranged at a downstream position of the straight pipe portion for drawing the liquid from the straight pipe portion, wherein said straight pipe portion, the inlet pipe portion and the outlet pipe portion are coupled with one another;
wherein said pair of ultrasonic signal transmission and reception elements are respectively arranged at the upstream position and the downstream position of said straight pipe portion;
wherein said disposable conduit is a particular disposable conduit among a plurality of disposable conduits each of which are usable at least one time with said non-disposable structure comprising said electrical measuring circuit in the respective flow rate measurement operations;
wherein said memory stores conduit specific calibration data which is specific to the particular disposable conduit and which is obtained from a standard electrical measuring circuit by flowing a standard liquid through said particular disposable conduit at plural known flow rates; and
wherein said electrical measuring circuit of said non-disposable structure is configured to: (i) read the conduit specific calibration data out of said memory upon an actual flow rate measurement operation using said particular disposable conduit, (ii) drive said pair of the ultrasonic signal transmission and reception elements to emit ultrasonic beams alternately, (iii) receive ultrasonic signals generated from the ultrasonic signal transmission and reception elements which receive the ultrasonic beams, (iv) calculate flow rates by processing the ultrasonic signals, and (v) correct the flow rates in accordance with the read conduit specific calibration data.

2. The ultrasonic type flowmeter apparatus according to claim 1, wherein said ultrasonic signal transmission and reception elements are secured to both ends of the straight pipe portion such that the ultrasonic signal transmission and reception elements are opposed to each other when viewed in a direction of a longitudinal axial line of the straight pipe portion.

3. The ultrasonic type flowmeter apparatus according to claim 1, wherein said conduit specific calibration data is formed by output signals produced from the standard electrical measuring circuit while the standard liquid is flown through said particular disposable conduit at said plural known flow rates.

4. The ultrasonic type flowmeter apparatus according to claim 1, wherein said disposable structure further includes first signal wires connected to said ultrasonic signal transmission and reception elements and second signal wires connected to said memory.

5. The ultrasonic type flowmeter apparatus according to claim 1, wherein said memory includes a semiconductor memory element.

6. The ultrasonic type flowmeter apparatus according to claim 1, wherein said non-disposable structure further comprises a holder for holding said disposable conduit.

7. The ultrasonic type flowmeter apparatus according to claim 6, wherein said holder is constructed to hold said disposable conduit in such a posture that the outlet pipe portion of the disposable conduit is situated at a level higher than a level at which said inlet pipe portion of the disposable conduit is situated.

8. A method of using an ultrasonic type flowmeter apparatus which comprises (A) a disposable structure that is disposed after use; and (B) a non-disposable structure comprising an electrical measuring circuit that is repeatedly used for a plurality of respective flow rate measurement operations and which is connectable to said disposable structure, wherein said disposable structure comprises: (A)(i) a disposable conduit including a pair of ultrasonic signal transmission and reception elements, and (A)(ii) a memory which is attached to said disposable conduit, wherein said disposable conduit has a straight pipe portion through which a liquid whose flow rate is to be measured is flown, an inlet pipe portion arranged at an upstream position of the straight pipe portion for introducing the liquid into the straight pipe portion, and an outlet pipe portion arranged at a downstream position of the straight pipe portion for drawing the liquid from the straight pipe portion, wherein said straight pipe portion, the inlet pipe portion and the outlet pipe portion are coupled with one another; wherein said pair of ultrasonic signal transmission and reception elements are respectively arranged at the upstream position and the downstream position of said straight pipe portion; wherein said disposable conduit is a particular disposable conduit among a plurality of disposable conduits each of which are usable at least one time with said non-disposable structure comprising said electrical measuring circuit in the respective flow rate measurement operations; and wherein said memory stores conduit specific calibration data which is specific to the particular disposable conduit and which is obtained from a standard electrical measuring circuit by flowing a standard liquid through said particular disposable conduit at plural known flow rates;

wherein said method comprises:
reading, with the electrical measuring circuit, the conduit specific calibration data out of said memory upon an actual flow rate measurement operation using said particular disposable conduit, and forming a calibrating equation or calibration table in accordance with the readout conduit specific calibration data;
driving, with the electrical measuring circuit, said pair of the ultrasonic signal transmission and reception elements to emit ultrasonic beams alternately;
receiving, with the electrical measuring circuit, ultrasonic signals generated from the ultrasonic signal transmission and reception elements which receive the ultrasonic beams;
calculating, with the electrical measuring circuit, flow rates by processing the ultrasonic signals; and
correcting, with the electrical measuring circuit, the calculated flow rates in accordance with the formed calibrating equation or calibration table.

* * * * *